Aug. 11, 1970     C. E. GARBER     3,523,648
BROADCAST SPREADER ATTACHMENT FOR GARDEN TRACTORS
Filed Feb. 19, 1968     2 Sheets-Sheet 1
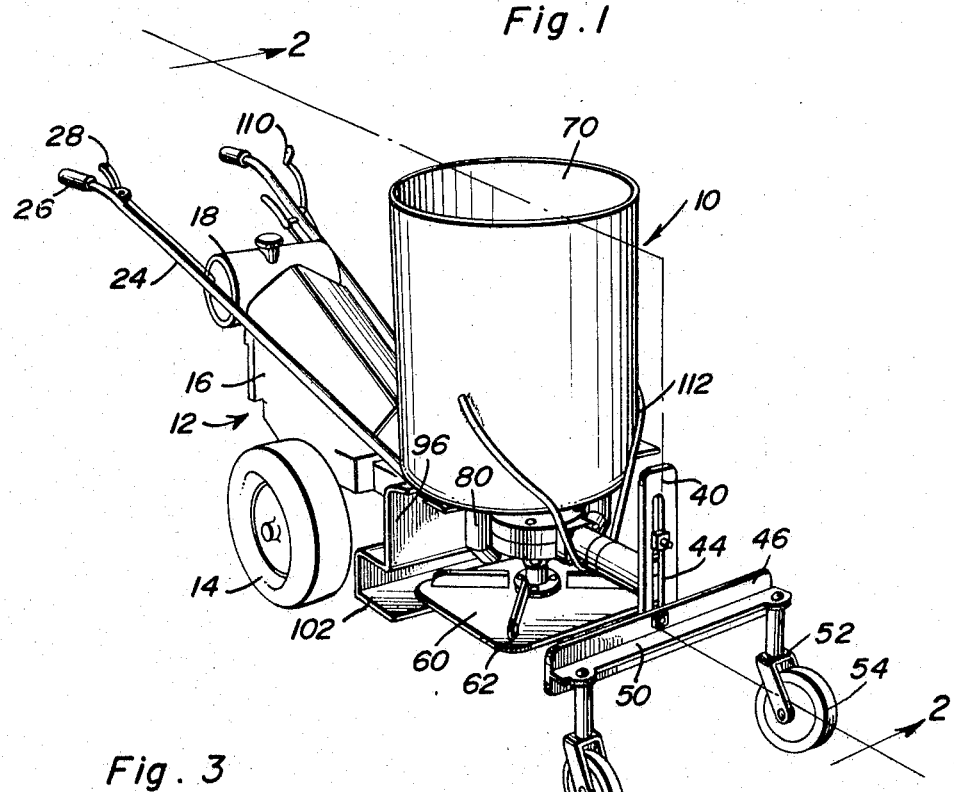
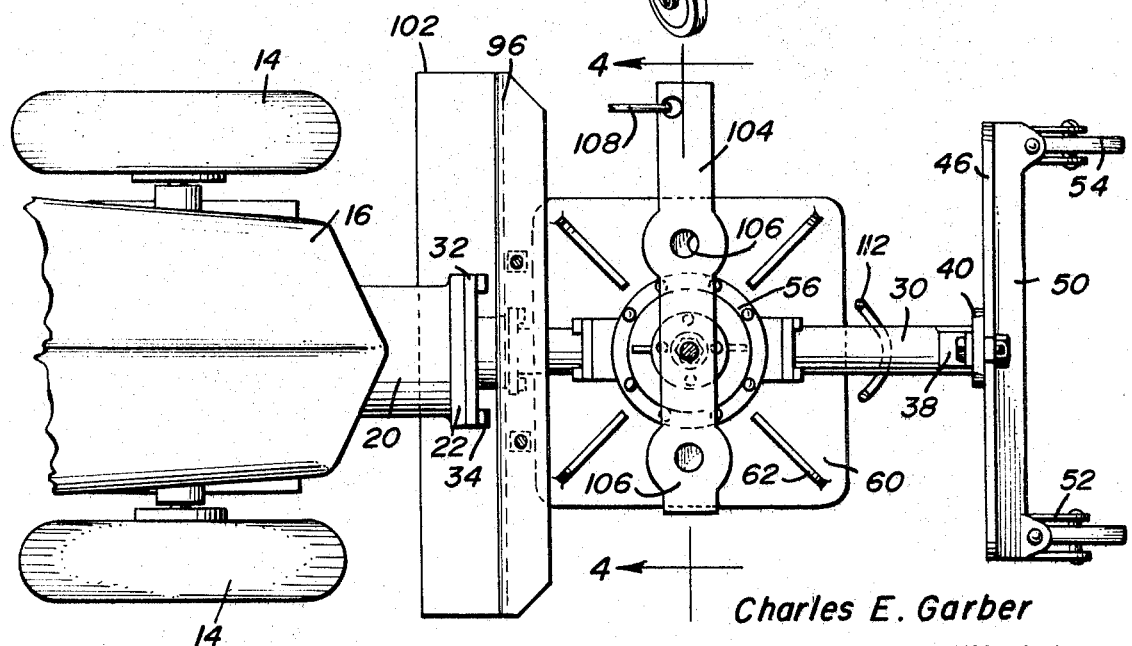
Charles E. Garber
INVENTOR.
BY *Clarence A. O'Brien*
*and Harvey B. Jacobson*
Attorneys Aug. 11, 1970   C. E. GARBER   3,523,648
BROADCAST SPREADER ATTACHMENT FOR GARDEN TRACTORS
Filed Feb. 19, 1968   2 Sheets-Sheet 2

Charles E. Garber
INVENTOR.

BY *Clarence A. O'Brien*
and *Harvey B. Jackson*
Attorneys

United States Patent Office 3,523,648
Patented Aug. 11, 1970

3,523,648
BROADCAST SPREADER ATTACHMENT FOR GARDEN TRACTORS
Charles E. Garber, 127 Cope St.,
Woodbridge, Va. 22191
Filed Feb. 19, 1968, Ser. No. 706,419
Int. Cl. A01c 17/00
U.S. Cl. 239—668          7 Claims

ABSTRACT OF THE DISCLOSURE

A broadcast spreader for attachment to a garden tractor of the type having a pair of driven wheels and rearwardly and upwardly extending handle bars for control thereof and a forwardly extending housing adapted to receive various implements. The attachment is attached to the housing and driven from a power shaft therein and includes forwardly disposed supporting wheels, a vertically oriented supply hopper for receiving material to be spread and a rotatable spreader plate underlying the hopper and receiving material therefrom. A control apparatus is provided for controlling the discharge of material from the hopper onto the spreader plate and a shield is provided for preventing the material being spread from traveling rearwardly toward the tractor and operator.

---

Garden tractors have been provided with various attachments by virtue of which such tractors may be used for various purposes. One type of well known conventional garden tractor includes a pair of driven wheels supporting an engine and transmission mechanism. Such tractors have a forwardly extending housing with a power shaft therein with various attachments normally being provided for attachment to the housing. The tractor is controlled by a pair of rearwardly and upwardly extending handle bars terminating in hand grips and other control devices.

It is an object of the present invention to provide an attachment for such a garden tractor whereby granular or powdered material such as fertilizer, lime or the like may be broadcast or spread evenly over a relatively wide area for enabling the garden tractor to be effectively used as a broadcast spreader.

In accomplishing the object of this invention, the spreader attachment includes a drive structure and housing therefor attached to the housing normally provided on the tractor and drivingly connected to the power shaft thereof together with a supporting wheel assembly which is vertically adjustable for enabling support of the spreader attachment. A hopper is disposed above the drive assembly and a powered rotatable spreader plate is disposed below the hopper and below the power- assembly. Disposed within the hopper is an agitator driven from the same shaft as the spreader plate and a control apparatus is provided for controlling the discharge of material from the hopped to the spreader plate. A shield plate is provided at the rear of the spreader plate to preclude material from being broadcast rearwardly towards the tractor and the operator thereof.

In carrying out the object of this invention, the structure provided is dependable and long lasting, easily assembled with and detached from the tractor and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throught, and in which:

FIG. 1 is a perspective view of the broadcast spreader attachment assembled with the garden tractor;

FIG. 3 is a top plan sectional view taken substantially upon a plane passing along section line 3J3 of FIG. 1 illustrating the structural details of the discharge control and spreader plate.

Figure 2:
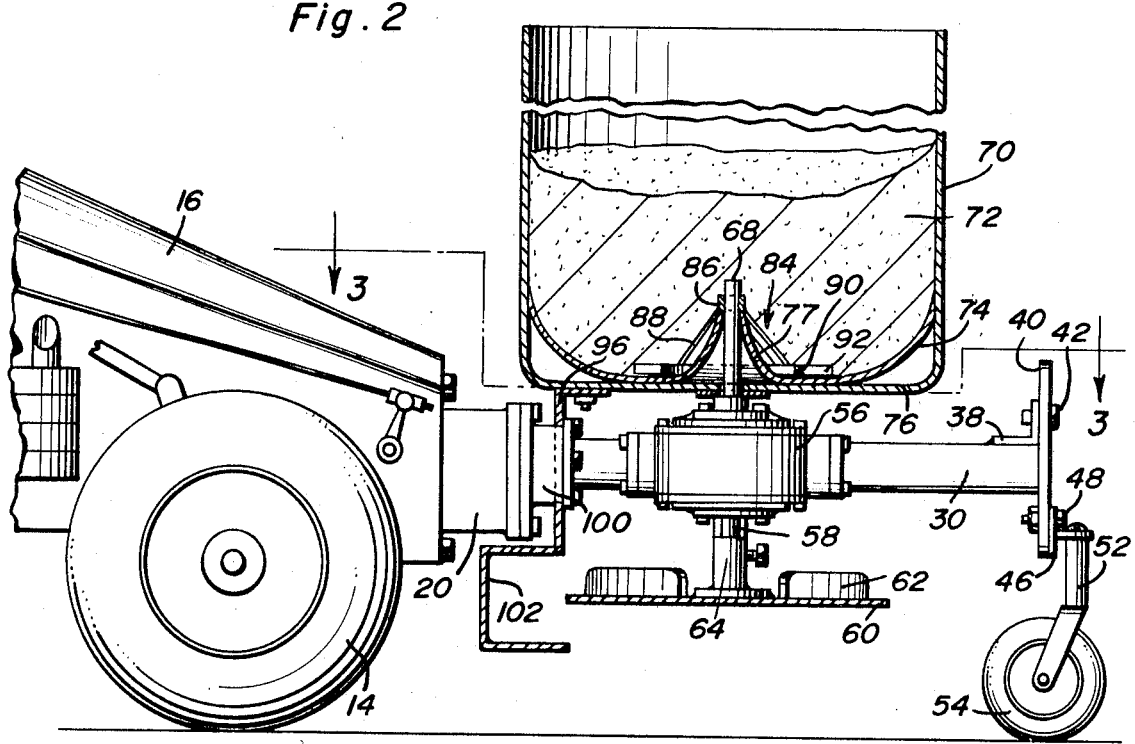
FIG. 2 is a vertical sectional view taken substantially upon a plane passing along section line 2J2 of FIG. 1 illustrating the structural details of the invention.

Referring now specifically to the drawings, the numeral 10 generally designates the broadcast spreader of the present invention attached to a conventional type of garden tractor generally designated by the numeral 12 which includes a pair of drive wheels 14 which support an engine and transmission assembly 16, fuel tank 18 and other related structure. The tractor 12 is conventional and includes a forwardly extending housing 20 terminating in an attaching flange 22 with a power shaft being disposed within the housing 20. Also, a pair of rearwardly and upwardly extending handle bars 24 are provided which terminate in hand grips 26 for enabling directional control of the tractor. Also, control levers 28 are provided adjacent the hand grips for controlling the speed and operating the clutch employed on the tractor to enable proper operation thereof.

The broadcast spreader attachment 10 includes a tubular housing 30 having an attaching flange 32 secured detachably to the flange 22 by fastening bolts 34 or the like. The housing 30 includes a power shaft 36 therein which is drivingly engaged with the power shaft in the housing 20 by a conventional coupling such as a splined coupling or the like. The front end of the tubular housing 30 is provided with an L-shaped lug 38 attached thereto with the upwardly extending flange of the lug 38 being attached to a vertically disposed plate 40 by a fastening bolt 42. The plate 40 includes a longitudinal slot 44 therein virtue of which the plate 40 can slide vertically in relation to the tubular housing 30. The lower end of the plate 40 is provided with the transversely extending plate 46 that is affixed thereto by a fastening bolt 48 or the like.

The transversely extending plate 46 is provided with a horizontally disposed flange 50 extending forwardly therefrom with each end of the flange 50 having a caster wheel yoke 52 swivelly attached thereto with each of the caster wheel yokes 52 supporting a caster wheel 54. With this construction, the elevational relationship between the caster wheels 54 and the housing 30 may be varied to provide stability and support to the combined broadcast spreader attachment and tractor.

Interposed in the central portion of the tubular housing 30 is a generally cylindrical gear box 56 from which a depending shaft 58 extends and which is drivingly connected to the shaft 36 in any suitable manner such as by a bevel gear, worm gear or the like so that the shaft 58 will be rotated at a desired relatively high speed for rotating a broadcast spreader plate 60 supported on the lower end of the shaft 58. The spreader plate 60 may be square or circular and is provided with upstanding radial vanes or projections thereon which are disposed in radial arrangement and diametrically opposed in alignment with the corners of the substantially square spreader plate 60. The center of the spreader plate 60 is provided with a hub 64 which is telescoped over the lower end of the shaft 58 and secured thereto by any suitable means such as a setscrew 66 or the like.

Projecting upwardly from the gear box 56 is an upwardly extending vertical shaft 68 which may be a separate shaft from the shaft 58 or may be a continuation thereof in which event the shaft 36 would have to be a sectional shaft. The shaft 68 extends vertically up through and into a substantially cylindrical hopper 70 which receives a quantity of fertilizer 72 or other granular material such as lime or the like.

The bottom interior of the hopper 70 is provided with a false bottom or baffle 74 which curves upwardly and merges with the peripheral wall of the hopper 70 and which curves downwardly along the bottom wall 76 of the hopper 70 and then upwardly into central cone 77 to guide the material being discharged toward a pair of feeder holes 78 provided in the hopper 70 and the false bottom 74. The holes 78 communicate with a pair of tubes 80 which extend downwardly toward the spreader plate 60 and which terminate in inwardly inclined terminal end portions 82 at the lower end thereof for discharging the material onto the spreader plate substantially the inner edge of the vanes or projections 62.

To prevent bridging of the discharge holes 78, an agitator is attached to the upper end of the shaft 68 which is generally designated by the numeral 84 and includes a hub 86 resting on the upper end of the cone 77. Extending downwardly and outwardly from hub 86 are spaced members 88 attached to the hub at the upper end thereof and attached to an annular ring 90 at the lower end thereof which is disposed adjacent the false bottom 74. The periphery of the ring 90 is provided with laterally extending projections or blades 92 extending over holes 78 to facilitate agitation of the material 72 in the hopper 70.

Figure 4:
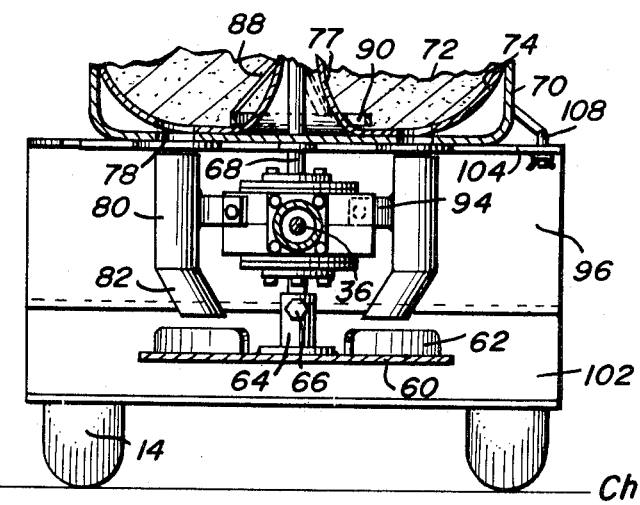
FIG. 4 is a transverse, sectional view taken substantially upon a plane passing along section line 4—4 of FIG. 2 illustrating further structural details of the broadcast spreader.

As illustrated in FIG. 4, the discharge tubes 80 are supported by brackets 94 attached to the gear box 54 and the hopper 70 is supported by a support plate 96 attached to the bottom of the hopper by fastener bolts 98 and extending downwardly and in encircling relation to an adapter 100 forming a portion of the tubular housing 30. The lower end of the plate 96 is provided with a rearwardly offset channel-shaped member 102 which partially receives the periphery of the spreader plate 60 and serves as a shield plate to prevent discharge of material rearwardly towards the tractor and the walking operator thereof.

As illustrated in FIG. 3, there is provided an elongated control plate 104 extending under the bottom 76 of the hopper 70 with the control plate 104 having a pair of apertures 106 therein which are in alignment with and may be registered with the discharge openings 78 at which time they will also be in alignment with the discharge tubes 80. The plate 104 is pivotally received on the shaft 68 with one end thereof extending laterally beyond the hopper 70 for attachment to an operating rod 108 which extends rearwardly alongside of one of the handle bars 24 and terminates in a lever 110 which enables the plate 104 to be pivoted to a position in alignment with the discharge openings 78 and the discharge tubes 80 or into a position misaligned therewith to form a closure for the discharge openings 78 thereby providing a flow control for the material 72.

To provide additional support for the hopper 70, the forward portion thereof is provided with a pair of downwardly extending brace rods 112 which may be welded thereto and welded to the housing 30 in any suitable manner to provide a sturdy and rigid hopper support.

Thus, with this invention, the walking operator of the tractor may control the speed and direction of movement thereof and also control rotation of the broadcast spreader and the position of the control plate 104 for varying the rate of discharge or completely opening the discharge openings or completely closing them. If desired, a calibrated gauge may be provided for the lever 110 to enable the operator to determine the quantity of fertilizer to be applied to a particular area being covered. Such a device could be calibrated to indicate pounds of material spread per acre traversed. Also, the spreader plate is located adjacent the ground so that the material being spread will not be carried away from the area on which it is spread by wind and also this provides much more accurate control of the direction in which the fertilizer or other material is being spread.

Where required, lubrication fittings and provisions may be provided to enable the device to be long lasting and it may be easily attached and removed from the tractor by manipulating the bolts 34 in a well known manner of attaching and removing garden tractor attachments.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A broadcast spreader for attachment to a garden-type tractor having a power output shaft comprising a supporting structure adapted to be connected with the tractor, power shaft means carried by said supporting structure for driving connection with the power shaft on the tractor, a supply hopper supported from the support structure, a rotatable spreader plate disposed below the hopper and supported by the support structure, said spreader plate being drivingly connected to the power shaft means for rotation thereof, means in the bottom of said hopper for discharging material therefrom, and means controlling the discharge of material from the hopper onto the spreader plate, support wheels carried by the outer end of the supporting structure, and means vertically adjustably supporting the support wheels from the support structure to provide support for the outer end of the attachment when connected with the tractors, said spreader plate being disposed in longitudinally spaced relation to the support wheels.

2. The structure as defined in claim 1 wherein said hopper includes a vertically disposed center shaft drivingly engaging said power shaft means, agitator means on said center shaft for agitating the material within the hopper to prevent bridging thereof over the discharge means.

3. The structure as defined in claim 2 wherein said spreader plate includes radially disposed vanes on the upper surface thereof, tubular guide means extending to a point adjacent the spreader plate and the discharge means in the hopper, said control means for controlling flow of material from the hopper including a movable plate having an aperture therein alignable with the discharge means in the hopper, and manual means connected with the plate for varying the position thereof.

4. The structure as defined in claim 1 together with a shield plate extending downwardly from the supply hopper to a position below the spreader plate and disposed in longitudinally spaced relation to the spreader plate and on the opposite side of the spreader plate from the support wheels, said hopper including a vertically disposed center shaft drivingly engaging said power shaft means with the center shaft being engaged with the spreader plate at the lower end, agitator means mounted on the center shaft within the hopper for agitating material therein.

5. A broadcast spreader for attachment to a garden-type tractor having a power output shaft comprising a supporting structure adapted to be connected with the tractor, power shaft means carried by said supporting structure for driving connection with the power shaft on the tractor, a supply hopper supported from the support structure, a rotatable spreader plate disposed below the hopper and supported by the support structure, said spread plate being drivingly connected to the power shaft means for rotation thereof, means in the bottom of said hopper for discharging material therefrom, and means controlling the discharge of material from the hopper onto the spreader plate, support wheels carried by the outer end of the supporting structure, and means vertically adjustably supporting the support wheels from the support structure to provide support for the outer end of the attachment when connected with the tractor, said hopper including a vertically disposed center shaft drivingly engaging said power shaft means, agitator means on said center shaft for agitating the material within the hopper to prevent bridging thereof over the discharge means, said spreader plate including radially disposed vanes on the upper surface thereof, tubular guide means extending to a point adjacent the spreader plate and the discharge means in the hopper, said control means for controlling flow of material from the hopper including a movable plate having an aperture therein alignable with the discharge means in the hopper, and manual means connected with the plate for varying the position thereof, said hopper including a false bottom curving inwardly with the agitator having a lower annular ring and radially extending projections thereon closely overlying the false bottom.

6. The structure as defined in claim 5 together with shield means mounted on the supporting structure and adapted to be disposed between said spreader plate and tractor to prevent discharge of material in the direction of the tractor.

7. The structure as defined in claim 5 wherein said spreader plate is longitudinally spaced from the support wheels, and a shield member extending downwardly from the bottom of the hopper to a position below the spreader plate and being disposed in longitudinally spaced relation to the spreader plate and on the opposite side thereof from the support wheels for preventing discharge of material in the direction of a tractor, said tubular guide means extending to a point adjacent the spreader plate including a pair of depending tubes communicating with the hopper with the lower ends of the tubes being disposed adjacent the upper edge of the radial vanes on the spreader plate, and means supporting the tubes from the supporting structure.

References Cited

UNITED STATES PATENTS

| | | | |
|---|---|---|---|
| 575,375 | 1/1897 | Reilly | 239—149 |
| 2,514,962 | 7/1950 | McElhatton | 239—683 |
| 2,550,872 | 5/1951 | Shaw | 239—683 X |
| 2,654,509 | 10/1953 | Faust | 239—683 X |
| 2,813,722 | 11/1957 | Pawela | 239—683 X |
| 3,394,892 | 7/1968 | Speicher | 239—683 |

M. HENSON WOOD, JR., Primary Examiner

M. Y. MAR, Assistant Examiner

U.S. Cl. X.R.

239—670, 683, 687